2 Sheets--Sheet 1.

C. C. SCHNEIDER.
Harvesters.

No. 154,620.

Patented Sept. 1, 1874.

WITNESSES
George E. Upham,
Robert Everett.

INVENTOR
Charles C. Schneider
By Chipman Hosmer & Co
ATTORNEYS.

2 Sheets--Sheet 2.
C. C. SCHNEIDER.
Harvesters.
No. 154,620.  Patented Sept. 1, 1874.
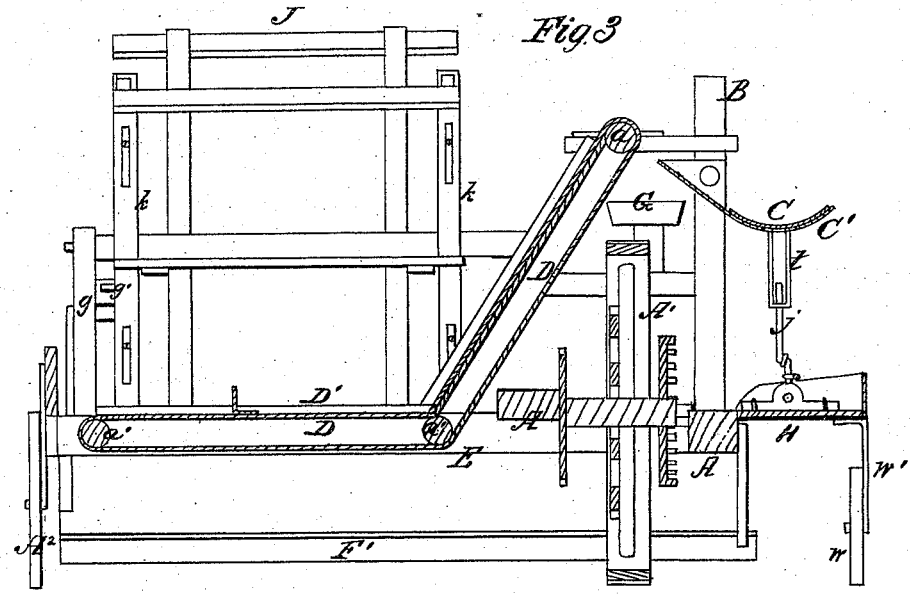
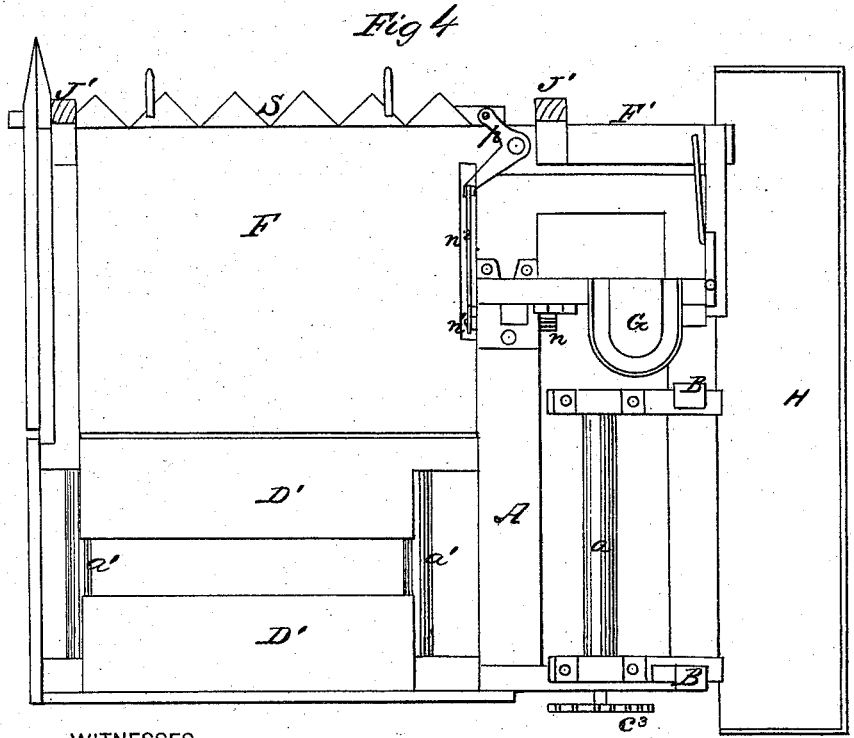
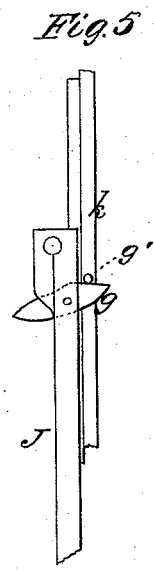
WITNESSES
George E. Upham,
Robert Everitt,
By
INVENTOR
Charles C. Schneider
Chipman Hosmer & Co
ATTORNEYS.

UNITED STATES PATENT OFFICE.

CHARLES C. SCHNEIDER, OF BELMONT STATION, WISCONSIN.

IMPROVEMENT IN HARVESTERS.

Specification forming part of Letters Patent No. 154,620, dated September 1, 1874; application filed March 21, 1874.

*To all whom it may concern:*

Be it known that I, CHARLES C. SCHNEIDER, of Belmont Station, in the county of LaFayette and State of Wisconsin, have invented a new and valuable Improvement in Harvesters; and I do hereby declare that the following is a full, clear, and exact description of the construction and operation of the same, reference being had to the annexed drawings making a part of this specification, and to the letters and figures of reference marked thereon.

Figure 1:
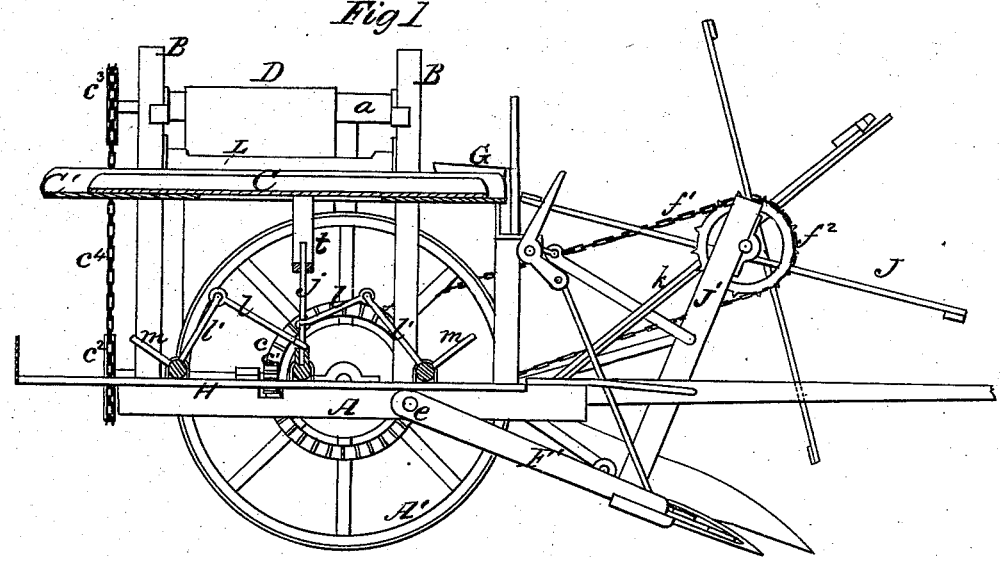
Figure 2:
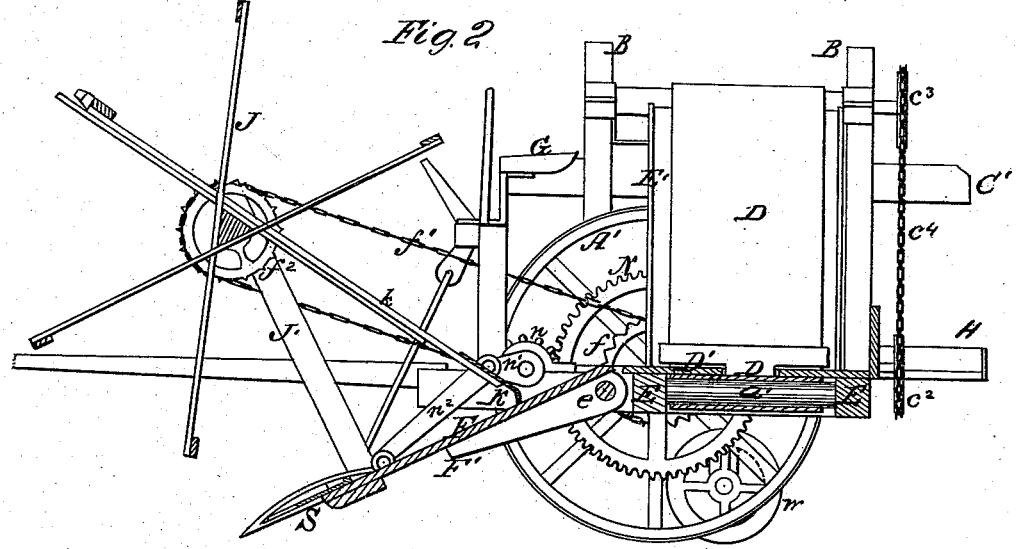

Figures 1 and 2 of the drawings are representations of longitudinal vertical sections of my harvester. Fig. 3 is a transverse sectional view of the same; and Fig. 4 is a plan view, and Fig. 5 is a detail view.

This invention has relation to harvesters; and the novelty consists in the means for actuating the dividing-blade, as hereinafter more fully described and claimed.

In the annexed drawings, A designates the main draft-frame, which is mounted on a large driving-wheel, $A^1$, and a smaller grain-wheel, $A^2$. On this frame A two posts, B, are erected, which afford supports for a grain-receiver, C, and also the upper roller, $a$, of an endless grain-carrier, D. On the grain side of the frame A a frame, E, is constructed, which affords supports for two longitudinal rollers, $a'$ $a'$, around which the horizontal portion of the endless grain-carrier passes, over which portion a floor, D', is constructed. The grain-carrier is an endless belt of india-rubber, or other suitable material, having a rake secured to it, which moves the grain laterally from the floor D', and carries it up an inclined trough, E', and deposits it into the grain-receiver C. This carrier D is revolved by means of the driving-wheel $A^1$, acting through the medium of wheels $c$ $c^1$ $c^2$ $c^3$ and a sprocket-chain, $c^4$. In front of the floor D' is the platform F, on which the cut grain falls. This platform is constructed on a frame, F', which is connected to the inner and outer sides of the draft-frame A, and also to the grain side of the frame E, by means of pivots $e$. The front end of the platform is thus vertically adjustable, and can be thus adjusted by means of a hand-lever and connecting-rod, which are located near a driver's seat, G, which is mounted on the front end of the draft-frame. This platform is adjustable independently of the floor D' and the draft-frame, for the purpose of cutting high or low without tilting the binders who stand on a platform, H. The shaft of the reel J has its bearings in the upper ends of two posts, J' J', which rise from the platform-frame F', and this reel receives its rotation from a sprocket-wheel, $f$, on the axle of the driving-wheel $A^1$, through the medium of a chain-band, $f^1$, and a sprocket-wheel, $f^2$, which is keyed on the reel-shaft. K designates a dividing-blade, which is secured to endwise-sliding arms $k$ $k$, which are applied to two of the reel-arms. The object of the blade K is to divide the cut grain on the platform F into quantities suitable for binding, and at the same time push the grain back upon the floor D', to be moved up to the receiver C. The plate K is allowed to drag over the platform while being moved backward by the revolution of the reel, and the endwise movement of the arms $k$ $k$; and for the purpose of holding up this plate K, while passing over the cutting apparatus, a rocking support, $g$, is applied to the outer reel-post, on which a pin, $g'$, on one of the arms $k$ slides. When the dividing-blade passes over the cutting apparatus pin $g'$ leaves its support $g$, and the blade drops on the platform. This feature of my invention is important, as it diminishes the labor of the binders, by dividing the grain automatically before its delivery into the grain-receiver C.

When the grain, divided as described, leaves the carrier, it falls upon an inclined plane, L, and is conducted into the receiver C. This receiver is trough-shaped, and it is applied on a table, C', which is of a corresponding shape, but of greater length than the receiver. The table C' is rigidly secured to the posts B, but the receiver C is longitudinally movable by means of levers and treadles, which have their fulcrums on the binders' platform H. The central arm $j$ plays freely in a stirrup, $t$, which is secured to the receiver C, and this arm has its fulcrum at the middle of the length of the platform H, as shown in Fig. 1. The arm $j$ is connected by rods $l$ $l$ to arms $l'$ $l'$, which are secured to rocking bars having treadles $m$ $m$ applied to them. The treadles $m$ $m$ are located near the ends of the platform H, where the two binders stand, so that these binders can move the receiver back and forth by a simple movement of their feet. By thus adjusting the receiver the binders move the grain to be bound in front of them, and bind it upon the ends of the table. The platform H, on which the binders stand, is connected to the inner side of the draft-frame A, by means of hinges, and its inner side is sustained upon the ground by means of a wheel, $w$, applied to the lower end of a standard, $w'$. The sickle S receives motion from a large spur-wheel, N, on the side of wheel $A^1$, through the medium of a pinion spur-wheel, $n$, crank $n^1$, pitman-rod $n^2$, and an angle-lever, $p$. (Shown in Fig. 4.)

What I claim as new, and desire to secure by Letters Patent, is—

The reciprocating dividing-blade K, provided with a pin, $g'$, and applied to a reel, J, said blade K actuated by means of the rocking support $g$, applied to the outer reel-post, substantially as described.

In testimony that I claim the above I have hereunto subscribed my name in the presence of two witnesses.

CHARLES CONRAD SCHNEIDER.

Witnesses:
   N. OLMSTED,
   EDWARD HARRIS.